(12) United States Patent
Brouwer et al.

(10) Patent No.: US 6,464,879 B1
(45) Date of Patent: Oct. 15, 2002

(54) TREATMENT OF PHOSPHATIZING WASTE WATER

(75) Inventors: Jan-Willem Brouwer, Willich; Peter Kuhm, Hilden; Jens Vier, Monheim, all of (DE)

(73) Assignee: Henkel Kommanditgesellschaft auf Aktien, Duesseldorf (DE)

( * ) Notice: Subject to any disclaimer, the term of this patent is extended or adjusted under 35 U.S.C. 154(b) by 0 days.

(21) Appl. No.: 09/555,930

(22) PCT Filed: Nov. 26, 1998

(86) PCT No.: PCT/EP98/07642

§ 371 (c)(1),
(2), (4) Date: Aug. 3, 2000

(87) PCT Pub. No.: WO99/29629

PCT Pub. Date: Jun. 17, 1999

(30) Foreign Application Priority Data

Dec. 5, 1997 (DE) .......................... 197 54 109

(51) Int. Cl.⁷ .................................. C02F 1/44
(52) U.S. Cl. ..................... 210/651; 210/805; 210/806; 118/603
(58) Field of Search ................. 210/650, 651, 210/805, 639, 806; 148/253–263; 118/63

(56) References Cited

U.S. PATENT DOCUMENTS

| | | | |
|---|---|---|---|
| 3,491,021 A | | 1/1970 | Huntington |
| 4,130,446 A | * | 12/1978 | Murakami et al. |
| 5,203,930 A | | 4/1993 | Blumlhuber et al. |
| 5,383,982 A | * | 1/1995 | Hauffe et al. |

FOREIGN PATENT DOCUMENTS

| | | |
|---|---|---|
| DE | 44 20 760 | 5/1995 |
| DE | 197 33 978 | 2/1999 |
| EP | 0 414 301 | 2/1991 |
| WO | WO97/30190 | 8/1997 |

* cited by examiner

Primary Examiner—Joseph W. Drodge
Assistant Examiner—Terry K. Cecil
(74) Attorney, Agent, or Firm—Stephen D. Harper; Daniel S. Ortiz

(57) ABSTRACT

A process for treating phosphatising bath overflow and/or wash water after phosphatising, phosphatising being performed using an acid, aqueous phosphatising solution which contains from 3 to 50 g/l of phosphate ions, calculated as $PO_4^{3-}$, from 0.2 to 3 g/l of zinc ions, optionally further metal ions and accelerator, characterised in that the accelerator is an organic molecule or molecular ion having a molecular weight of at least 80 g/mol, and that the phosphatising bath overflow and/or the wash water is subjected to ultrafiltration. The permeate from ultrafiltration is preferably separated further by means of nanofiltration or reverse osmosis. The permeate from the second separation may be recycled as wash water; the retentate may be recycled to the phosphatising bath.

20 Claims, No Drawings

TREATMENT OF PHOSPHATIZING WASTE WATER

FIELD OF THE INVENTION

This invention relates to the field of phosphatising metal surfaces, such as is performed as a widely used corrosion protective measure in the metal processing industry, such as the automobile industry and the domestic appliance industry, but also sometimes in steelworks. It relates to a process for treating the overflow from phosphatising baths or the wash water after phosphatising. The process simplifies effluent treatment and enables, in a preferred embodiment, recycling of the bath constituents to the phosphatising bath.

BACKGROUND OF THE INVENTION

The phosphatising of metals is aimed at producing metal phosphate layers which penetrate the metal surface in order to improve the existing corrosion resistance and, in combination with lacquers and other organic surface coatings, contributes to a substantial increase in adhesion and in the resistance to creepage under corrosive conditions. These types of phosphatising processes have been known for some time in the prior art. Low-zinc phosphatising processes in which the phosphatising solutions have comparatively low concentrations of zinc ions of e.g. from 0.5 to 2 g/l, are suitable in particular for preliminary treatment prior to lacquering. An important parameter in these low-zinic phosphatising baths is the ratio by weight of phosphate ions to zinc ions which is generally in the region of greater than 12 and may have values of up to 30.

It has been shown that phosphate layers having greatly improved corrosion protective and lacquer adhesive properties may be produced by also using polyvalent cations other than those of zinc. For example, low-zinc processes with the addition of, e.g., from 0.5 to 1.5 g/l of manganese ions and, e.g., from 0.3 to 2.0 g/l of nickel ions, as the so-called tri-cation process, are widely used for preparing metal surfaces for lacquering, for example for the cathodic electrodeposition lacquering of car bodies.

A phosphatising solution contains layer-producing components, such as zinc ions, and optionally other divalent metal ions, as well as phosphate ions. In addition, a phosphatising solution contains non-layer-forming components, such as in particular accelerators and the degradation products thereof. The degradation products of the accelerator are produced when this reacts with hydrogen formed at the metal surface by the pickling reaction. The non-layer-forming components which accumulate in the phosphatising bath over time such as alkali metal ions and, in particular, degradation products of the accelerator, may only be removed from the phosphatising solution by removing and discarding some of the phosphatising solution and continuously or batchwise replacing this with fresh phosphatising solution. Phosphatising solution may be removed, for example, by providing the phosphatising bath with an overflow and discarding the overflowing solution. However, an overflow is not generally required because an adequate amount of phosphatising solution is removed as a liquid film adhering to the phosphatised metal parts.

After the phosphatising process, the phosphatising solution adhering to the phosphatised parts, for example car bodywork, is washed off with water. Since the phosphatising solution contains heavy metals and optionally other components which cannot be released into the environment in an uncontrolled manner, the wash water has to be subjected to a water treatment process. This has to be performed in a separate step prior to introduction to a biological water treatment plant since otherwise the ability of the water treatment plant to function correctly would be at risk.

Since both the waste disposal of effluent (from the phosphatising bath overflow and/or wash water) and also the provision of the phosphatising plant with fresh water represent cost factors, there is a requirement to minimise these costs. DE-C-44 20 760 describes a process and a plant for regenerating or concentrating spent surfactant-containing iron phosphatising baths. This does not therefore refer to a zinc phosphatising process as described above in which crystalline zinc-containing phosphate layers are produced on the treated metal surfaces. Rather, this process describes an iron phosphatising process in which amorphous layers of iron phosphate and iron oxide are produced on iron surfaces. If surfactants are added to the iron phosphatising solution, then these also act as cleansers. In the document mentioned, the regeneration of this type of surfactant-containing iron phosphatising solution is achieved by ultrafiltration. This is performed in such a way that the surfactants are largely retained as the retentate. The permeate contains the metal ions and has to be disposed of The other components of the iron phosphatising solution may be added to the surfactants retained in the retentate and these are then returned to the phosphatising bath. Some of the active substances in the iron phosphatising solution may be recycled by this process and the quantities of effluent and fresh water involved are minimise.

EP-A-414 301 relates to an effluent-free process for producing phosphate coatings on metal surfaces using aqueous zinc phosphate solutions which contain iron(II) and nitrate ions. In this case, the phosphatising bath is connected in series with a wash bath cascade consisting of at least two wash baths. Low-salt, preferably salt-free water, is fed into tile last wash bath, each water overflow is introduced into the preceding wash bath or the phosphatising bath and at least enough low-salt or salt-free water is withdrawn from the phosphatising bath for it to be able to accept phosphate-enriched wash water from the cascade. However, this cannot prevent undesired components, such as degradation products of the accelerator, accumulating in the phosphatising bath.

SUMMARY OF THE INVENTION

An object of the present invention is to provide a process for treating phosphatising bath overflows and/or wash water after phosphatising, which at least enables simplified effluent treatment. The process is intended to be operated, if possible, in such a way that at least partial recycling of the components to the phosphatising bath is possible without large amounts of degradation products of the accelerator being returned to the phosphatising bath. Furthermore, it is intended that the process, if required, will provide treated water for the wash cascade.

DETAILED DESCRIPTION OF THE INVENTION

This object is achieved by a process for treating phosphatising, bath overflow and/or wash water after phosphatising, wherein phosphatising is performed using an acid aqueous phosphatising, solution which contains from 3 to 50 g/l of phosphate ions, calculated as $PO_4^{3-}$, from 0.2 to 3 g/l of zinc ions, optionally further metal ions and accelerator, characterised in that the accelerator is an organic molecule or molecular ion having, a molecular weight of at least 80 g/mol and that the phosphatising bath overflow and/or the wash water is subjected to ultrafiltration.

The zinc concentration is preferably in the range from 0.4 to 2 g/l and in particular from 0.5 to 1.5 g/l as is conventional for the low-zinc process. The ratio, by weight, of phosphate ions to zinc ions in the phosphatising, baths may vary over wide limits provided it is in the range between 3.7 and 30. A ratio, by weight, of between 10 and 20 is particularly preferred.

The phosphatising bath may contain other components apart from zinc and phosphate ions, such as are currently conventional in phosphatising baths.

Preferably, phosphatising solutions are used which contain mono- or di-valent metal ions which, as is known from experience, have a beneficial effect on the adhesion of lacquer and on the corrosion protective effect of the phosphate layers produced therewith. Accordingly, the phosphatising solution according to the present invention preferably also contains one or more of the following cations:

from 0.1 to 4 g/l of manganese(II),
from 0.2 to 2.5 g/l of magnesium(II),
from 0.2 to 2.5 g/l of calcium(II),
from 0.002 to 0.2 g/l of copper(II),
from 0.1 to 2 g/l of cobalt(II).

If desired, the phosphatising solutions may also contain nickel ions. However, for occupational health and ecological reasons, phosphatising baths are preferred which contain as low as possible a concentration of nickel ions or, if required, may also be nickel-free. For example, the phosphatising solution contains, in addition to zinc ions, from 0.1 to 4 g/l of manganese ions, from 0.002 to 0.2 g/l of copper ions and not more than 0.05 g/l, in particular not more than 0.001 g/l, of nickel ions as additional cations. However, if traditional tri-cation technology is to be used, phosphatising baths which contain 0.1 to 4 g/l of manganese ions and also 0.1 to 2.5 gal of nickel ions, in addition to the zinc ions, may be used. The form in which the cations are introduced into the phosphatising baths is in principle of no importance. Oxides and/or carbonates are used in particular as cation sources. Due to the risk of salting-out in phosphatising baths, salts of acids other than phosphoric acid should preferably be avoided.

In the case of phosphatising baths which are intended to be suitable for different substrates, if this has conventionally been the case, free and/or complexed fluoride should be added in amounts of up to 2.5 g/l of total fluoride, of which up to 750 mg/l is free fluoride, each calculated as $F^-$. In the absence Of fluoride, the aluminum concentration of the bath should not exceed 3 mg/l. In the presence of fluoride, as a result of complex formation, higher aluminum concentrations may be tolerated provided the concentration of non-complexed aluminum does not exceed 3 mg/l.

In addition to layer-forming divalent cations, phosphatising baths generally also contain sodium, potassium and/or ammonium ions to adjust the free acid content.

The principle of the present invention is based on the fact that accelerators are used which, both themselves and the degradation products thereof (i.e. reduction products), are large molecules in comparison to the other components in the phosphatising bath. They may therefore be separated from the cations and anions in the phosphatising bath by using a membrane having a suitable cut-off limit. The cut-off limit of the membrane thus lies in the region which is termed ultrafiltration. Surprisingly, accelerator molecules and the degradation products thereof are preferentially retained, in contrast to metal ions, when the molecular weights thereof are well below the nominal cut-off limit of the membrane. The separating effect is clearly evident above a molecular weight of at least 80 g/mol. The separating effect becomes more obvious when the molecular weight is at least 100 g/mol in the case of ring-shaped molecules and at least 150 g/mol in the case of non-ring-shaped molecules. For example, in the context of the process according to the present invention, carbohydrates (sugars) having at least five, preferably at least six, carbon atoms, may be used as accelerators.

The accelerator is preferably a nitrogen-containing homocyclic or heterocyclic organic molecule or molecular ion.

The accelerator is preferably selected from nitro-substituted benzene sulfonic acids or salts thereof or from) organic N-oxides. The use of nitro-substituted benzene sulfonic acids or salts thereof as accelerators has been known for decades. Benzene sulfonic acids having one or two nitro groups are preferred. The compound from this group most commonly used as an accelerator is m-nitrobenzene sulfonic acid. It is particularly appropriate for the process according to the present invention that its "degradation products" (molecules which are produced during reduction of the accelerator by hydrogen) sometimes have a molecular weight which is higher than that of the accelerator itself due to coupling of two ring systems.

On the other hand, the accelerator or accelerators may be selected from organic N-oxides. Obviously these may be used together with the nitro-substituted benzene sulfonic acids. Organic N-oxides which are preferred are those which have a saturated, unsaturated or aromatic 5- or 6-membered ring system and in which the N atom in the N-oxide is a constituent of this ring system. Examples of these types of compounds are the N-oxides of substituted or unsubstituted pyrroles, imidazoles, oxazoles, pyridines, pyrimidines, pyrazines, oxazines or hydrogenation products thereof which contain saturated or partially unsaturated rings. The use of N-oxides of substituted or unsubstituted pyridines and morpholines, such as, in particular, pyridine N-oxide, 2-methylpyridine N-oxide, 4-methylpyridine N-oxide, morpholine N-oxide and N-methylmorpholine N-oxide, are particularly preferred. The last mentioned compound is most particularly preferred. The phosphatising solution may contain one or more of these N-oxides. The total concentration of N-oxides in the phosphatising solution is preferably in the range from 0.1 to 3 g/l and in particular in the range from 0.3 to 2 g/l. Phosphatising baths which contain these types of N-oxides as accelerators are disclosed in DE-A-197 33 978.

One of the target ecological effects of the present invention is greatly to reduce the nitrogen content of effluents when using nitrogen-containing accelerators. Since nitrate ions pass through the ultrafiltration membrane, it is therefore preferred that the phosphatising solution contains no nitrate ions. Chloride ions and oxyanions of halogens are preferably also excluded since these accumulate in the phosphatising bath during possible recycling of the optionally further-concentrated permeate from ultrafiltration and would lead to salting-out. In addition the concentration of sulfate ions in the phosphatising bath should not exceed a certain upper limit, for example about 30 g/l. Due to the option to recycle the permeate, phosphatising baths which also contain no sulfate ions are preferably used.

A variety of types of membrane for ultrafiltration are available from the prior art. Since phosphatising baths and the corresponding wash waters are acidic, the ultrafiltration membrane used must be stable under acid conditions. Inorganic membranes, such as ceramic membranes are suitable. Furthermore, organic polymer membranes may be used. A polyamide membrane is particularly suitable.

In the simplest embodiment, the process according to the present invention is performed in such a way that the permeate and the retentate (i.e. the concentrate) from ultrafiltration are disposed of separately. For example, the concentrate from ultrafiltration may be further concentrated by evaporation and then disposed of. The distillate which is produced by evaporation may be recycled as wash water. The permeate from ultrafiltration, in which the organic components (accelerators and degradation products thereof) are greatly depleted, may be recycled to the phosphatising bath. The layer-forming cations present in the overflow from the phosphatising bath or in the wash water are then not discarded or at least not completely discarded, but recycled to the phosphatising solution. The concentrations of these cations in the phosphatising solution then have to be increased only to the extent that they have been consumed as a result of phosphate-layer formation or due to sludge production in the phosphatising bath. This leads on the one hand to lower waste disposal costs and, on the other hand, to a more economical method of operating the phosphatising baths since smaller amounts of the components have to be added as fresh material.

The process according to the present invention is performed in a particularly advantageous manner if the permeate from ultrafiltration is separated further by means of a membrane process using a lower cut-off limit, for example by nanofiltration or by reverse osmosis. Membranes having appropriate cut-off limits may be used for this. Ceramic membranes or polymer membranes may be used for nanofiltration. Polymer membranes having appropriate specifications are also suitable for reverse osmosis. Polyamide membranes are particularly preferred in this case.

During nanofiltration or reverse osmosis, the ions from the phosphatising bath are retained in the retentate, while the permeate is substantially salt-free water. The retentate from nanofiltration or reverse osmosis which contains the ionic components from the phosphatising solution in enriched form is preferably returned to the phosphatising solution. The permeate from nanofiltration or from reverse osmosis is preferably used as wash water after phosphatising.

This combination of ultrafiltration and nanofiltration or reverse osmosis limits the waste water produced from phosphatising to the retentate from ultrafiltration which is optionally further concentrated. The rest of the water is recycled to the phosphatising process. The amounts of waste water produced are thus considerably reduced which is associated with ecological and economic advantages. In addition, substantially less fresh water is required in the phosphatising process. At least some of the layer-forming components are recycled to the phosphatising solution. This produces further economic and ecological advantages.

EXAMPLE

The process according to the present invention using filtration, followed by nanofiltration of the permeate was tested on wash water after phosphatising. The wash water was ultrafiltered through a "Desal G5" membrane consisting of polyamide. Contamination of the samples with chemical oxygen demand (COD) due to the accelerator used, m-nitrobenzene sulfonic acid and its reduction products, and the concentrations in the wash water of zinc, nickel, manganese and iron are listed in the Table. Furthermore, the Table gives the corresponding values in the permeate and in the retentate from ultrafiltration and nanofiltration. The permeate from ultrafiltration was vised as the feedstock solution for nanofiltration. Both membrane filtration processes were operated in Such a way that the ratio, by volume, of retentate to concentrate was 1:1. By optimising the operating conditions, such as by using a larger membrane area, the ratio, by volume, of retentate to permeate may be shifted further in the direction of the permeate. The overall separating effect is then more pronounced. However, the example demonstrates quite clearly that the organic components are much more enriched than the metal ions in the retentate from ultrafiltration. Accordingly, the organic components in the permeate from ultrafiltration are greatly depleted, relative to the metal ions.

As a result of nanofiltration of the permeate from ultrafiltration, on the one hand, a permeate is obtained which is very slightly polluted with organic components and metal ions and which may be re-used as wash water. In the concentrate from nanofiltration, as compared with the wash water prior to ultrafiltration, the organic components are greatly depleted relative to the layer-forming cations.

TABLE

Effect of ultrafiltration, followed by nanofiltration, of the permeate on phosphatising wash water. Concentrations in mg/l.

| | Wash water | Ultrafiltration retentate | Ultrafiltration permeate | Nanofiltration retentate | Nanofiltration permeate |
|---|---|---|---|---|---|
| COD | 550 | 1030 | 91 | 145 | 35 |
| Zn | 115 | 152 | 79 | 154 | 4 |
| Ni | 57 | 66 | 38 | 74 | 2 |
| Mn | 59 | 74 | 43 | 84 | 2 |

Operating conditions:

| Ultrafiltration | Nanofiltration |
|---|---|
| Desal G5 membrane | Desal DK membrane |
| Pressure difference 5 bar | Pressure difference 7 bar |
| Temperature 35° C. | Temperature 35° C. |
| Membrane flow 15 l/m$^2$h | Membrane flow 35–45 l/m$^2$h |

What is claimed is:

1. A process for treating phosphatizing bath overflow, phosphatizing bath wash water after phosphatizing, or both phosphatizing bath overflow and phosphatizing bath wash water after phosphatizing, phosphatizing being performed using an acidic, aqueous phosphatizing solution which contains from 30 to 50 g/l of phosphate ions, calculated as $PO_4^{3-}$, from 0.2 to 3 g/l of zinc ions, and an accelerator selected from the group consisting of organic molecules and molecular ions that have a molecular weight of at least 80 g/mole, and optionally further metal ions, said process comprising an operation in which the phosphatizing bath overflow, phosphatizing wash water, or both the phosphatizing bath overflow and the phosphatizing wash water are subjected to ultrafiltration to form an ultrafiltration permeate in which organic components are depleted and an ultrafiltration retentate separated from the ultrafiltration permeate to provide a recycle stream to the phosphatizing solution, said recycle stream being depleted of said accelerator and degradation products thereof yet retaining layer-forming cations from said overflow and/or said wash water.

2. A process as claimed in claim 1 wherein the accelerator is selected from the group consisting of carbohydrates having at least five carbon atoms per molecule.

3. A process as claimed in claim 2 wherein the phosphatizing solution does not contain nitrate ions, chloride ions, or oxyanionss of halogens.

4. A process as claimed in claim 3 wherein ultrafiltration is preformed through a polyamide membrane.

5. A process as claimed in claim 4 wherein the ultrafiltration permeate is subjected to reverse osmosis or nanofiltration and retentate from reverse osmosis or nanofiltration is recycled to the phosphatizing solution.

6. A process as claimed in claim 1 wherein the accelerator is selected from the group consisting of nitrogen-containing homocyclic and heterocyclic organic molecules and molecular ions.

7. A process as claimed in claim 6 wherein the accelerator is selected from the group consisting of nitro-substituted benzene sulfonic acids, salts thereof, and organic N-oxides.

8. A process as claimed in claim 7 wherein the phosphatizing solution does not contain nitrate ions, chloride ions, or oxyanions of halogens.

9. A process as claimed in claim 8 wherein ultrafiltration is performed through a polyamide membrane.

10. A process as claimed in claim 9 wherein the ultrafiltration permeate is subjected to reverse osmosis or nanofiltration and retentate from reverse osmosis or nanofiltration is recycled to the phosphatizing solution.

11. A process as claimed in claim 6 wherein the phosphating solution does not contain nitrate ions, chloride ions, or oxyanions of halogens.

12. A process as claimed in claim 11 wherein ultrafiltration is performed through a polyamide membrane.

13. A process as claimed in claim 12 the ultrafiltration permeate is subject to reverse osmosis or nanofiltration and retentate from reverse osmosis or nonofiltration is recycled to the phosphatizing solution.

14. A process as claimed in claim 1 wherein the ultrafiltration permeate and the ultrafiltration retentate are disposed of separately.

15. A process as claimed in claim 1 wherein at least some of the ultrafiltration permeate is recycled to the phosphatizing solution.

16. A process as claimed in claim 1 wherein permeate from reverse osmosis or from nanofiltration is recycled as wash water.

17. A process as claimed in claim 1 wherein the phosphatizing solution does not contain nitrate ions, chloride ions, or oxyanions of halogens.

18. A process as claimed in claim 17 wherein ultrafiltration is performed through a polyamide membrane.

19. A process as claimed in claim 1 wherein ultrafiltration is performed through a polyamide membrane.

20. A process as claimed in claim 1 wherein the ultrafiltration permeate is subjected to reverse osmosis or nonofiltration and retentate from reverse osmosis or nanofiltration is recycled to the phosphatizing solution.

\* \* \* \* \*

UNITED STATES PATENT AND TRADEMARK OFFICE
CERTIFICATE OF CORRECTION

PATENT NO. : 6,464,879 B1
DATED : October 15, 2002
INVENTOR(S) : Brouwer et al.

It is certified that error appears in the above-identified patent and that said Letters Patent is hereby corrected as shown below:

<u>Title page, Item [54] and Column 1, line 1,</u>
Title, delete "PHOSPHATIZING", and insert therefor -- PHOSPHATING --.

<u>Column 6,</u>
Lines 59 and 60, delete "phosphating" and insert therefor -- phosphatizing --.
Line 61, delete "oxyanionss", and insert therefor -- oxyanions --.

<u>Column 7,</u>
Lines 17 and 18, delete "phosphating", and insert therefor -- phosphatizing --.
Line 22, after "claim 12", insert therefor --wherein --.
Line 23, delete "subject", and insert therefor -- subjected --.

<u>Column 8,</u>
Line 1, delete "nonofiltration", and insert therefor -- nanofiltration --.
Lines 20 and 21, delete "nonofiltration", and insert therefor -- nanofiltration --.

Signed and Sealed this

Tenth Day of June, 2003

JAMES E. ROGAN
*Director of the United States Patent and Trademark Office*